US007650984B2

(12) United States Patent
Giuliani et al.

(10) Patent No.: US 7,650,984 B2
(45) Date of Patent: Jan. 26, 2010

(54) DEVICE FOR VARYING THE SEPARATION PITCH BETWEEN ARTICLES CONVEYED

(75) Inventors: Cristian Giuliani, Pineto (IT); Massimiliano Lombardi, Montesilvano (IT); Paolo Pasqualoni, Sambuceto di San Giovanni Teatino (IT)

(73) Assignee: Fameccanica.Data S.p.A., Sambuceto di San Giovanni Teatino (Chieti) (IT)

( * ) Notice: Subject to any disclaimer, the term of this patent is extended or adjusted under 35 U.S.C. 154(b) by 97 days.

(21) Appl. No.: 12/067,010

(22) PCT Filed: Sep. 12, 2006

(86) PCT No.: PCT/IB2006/002722

§ 371 (c)(1),
(2), (4) Date: Mar. 14, 2008

(87) PCT Pub. No.: WO2007/039800

PCT Pub. Date: Apr. 12, 2007

(65) Prior Publication Data

US 2008/0264761 A1  Oct. 30, 2008

(30) Foreign Application Priority Data

Oct. 5, 2005  (EP)  .................................. 05425692

(51) Int. Cl.
*B65G 17/46* (2006.01)
(52) U.S. Cl. .................................. 198/471.1; 198/459.8
(58) Field of Classification Search ............. 198/459.1, 198/459.2, 459.8, 471.1, 474.1
See application file for complete search history.

(56) References Cited

U.S. PATENT DOCUMENTS 3,728,191 A  4/1973  Wierzba et al.
(Continued)

FOREIGN PATENT DOCUMENTS

EP  1162162 A1  12/2001
(Continued)

OTHER PUBLICATIONS

International Search Report for corresponding International Application No. PCT/IB2006/002722, dated Feb. 7, 2007.
(Continued)

*Primary Examiner*—James R Bidwell
(74) *Attorney, Agent, or Firm*—Heslin Rothenberg Farley & Mesiti P.C.; Victor A. Cardona, Esq.

(57) ABSTRACT

A device for carrying out a "re-pitching" operation, i.e., an operation for changing the pitch between articles included in a flow of moving articles, includes one or more elements for conveying the articles, which are able to perform an orbital movement about a principal axis between a position for pick-up and a position for release of the articles. The speed of the orbital movement is selectively variable in the passage between the position for pick-up and the position for release. Members are provided for distribution of subatmospheric pressure to the conveying elements to enable them to carry out selectively an action of suction to pick up the articles. The members include a distributor, which can turn about the aforesaid principal axis. Set between the rotating distributor and each conveying element is a respective flexible pipe or hose for transferring the subatmospheric pressure to the conveying element. The flexibility of the pipe enables relative angular orientation between the distributor and the conveying element with respect to the aforesaid principal axis.

21 Claims, 3 Drawing Sheets

U.S. PATENT DOCUMENTS

| | | | |
|---|---|---|---|
| 3,941,233 A * | 3/1976 | Aiuola et al. | 198/471.1 |
| 4,483,351 A | 11/1984 | Seragnoli | |
| 4,506,779 A | 3/1985 | Seragnoli | |
| 4,726,876 A | 2/1988 | Tomsovic, Jr. | |
| 4,772,525 A * | 9/1988 | Badesha et al. | 430/58.2 |
| 4,880,102 A | 11/1989 | Indrebo | |
| 5,480,021 A | 1/1996 | Belvederi et al. | |
| 6,098,785 A * | 8/2000 | Van Maanen | 198/459.8 |
| 2002/0112939 A1 * | 8/2002 | Sumi et al. | 198/459.2 |
| 2003/0051978 A1 * | 3/2003 | Steiniger et al. | 198/459.1 |
| 2004/0047715 A1 | 3/2004 | Blakesley et al. | |
| 2004/0124068 A1 * | 7/2004 | Berndtsson | 198/459.2 |
| 2004/0262127 A1 | 12/2004 | Harnish et al. | |

FOREIGN PATENT DOCUMENTS

| | | |
|---|---|---|
| EP | 1179495 A1 | 2/2002 |
| EP | 1162162 B1 | 11/2006 |

OTHER PUBLICATIONS

Written Opinion of the International Searching Authority for corresponding International Application No. PCT/IB2006/002722, dated Feb. 7, 2007.

* cited by examiner

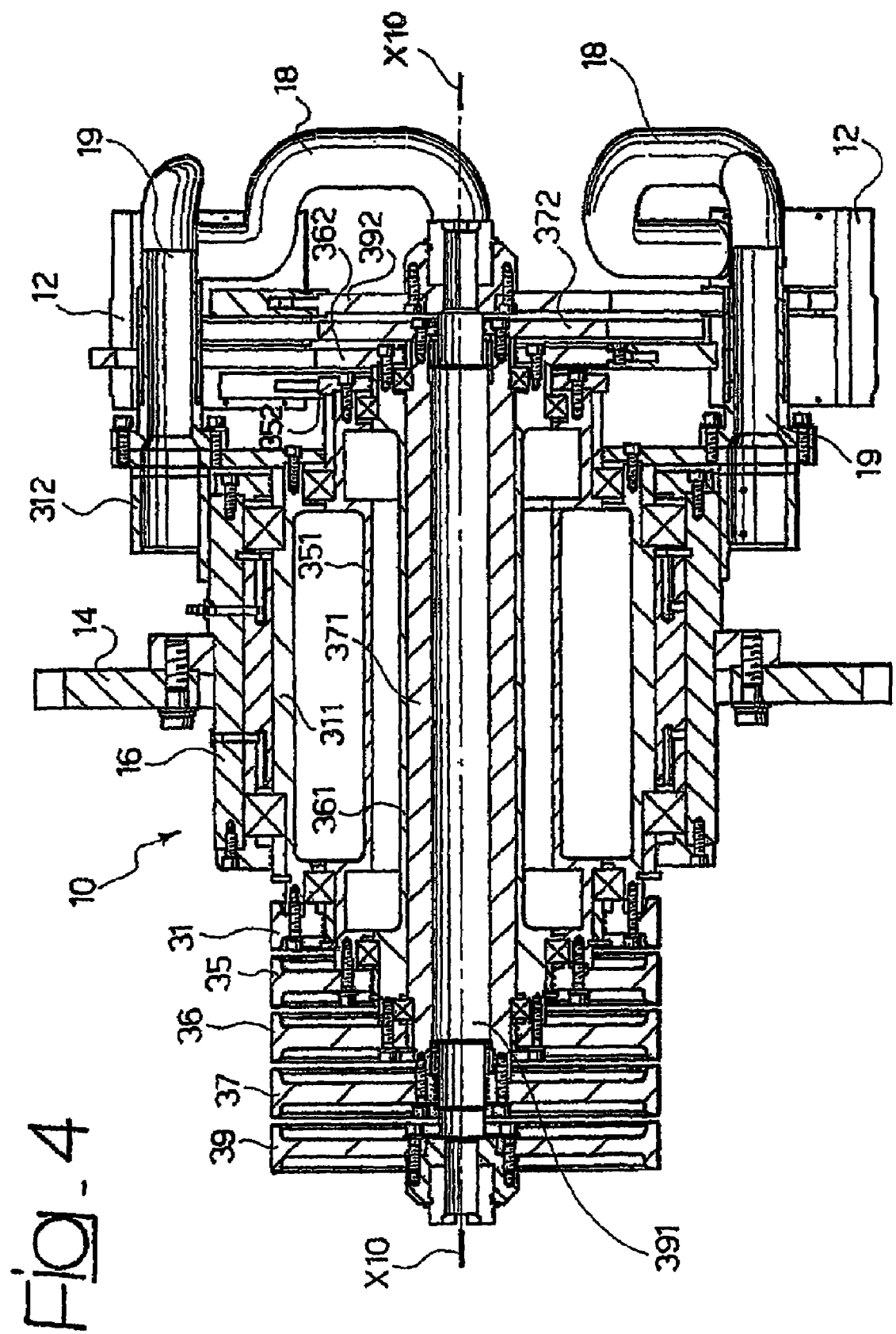

DEVICE FOR VARYING THE SEPARATION PITCH BETWEEN ARTICLES CONVEYED

This application is a national stage filing under section 371 of International Application No. PCT/IB2006/002722, filed on Sep. 12, 2006, and published in English on Apr. 12, 2007, as WO 2007/039800 and claims priority of European application No. 05425692.0 filed on Oct. 5, 2005, the entire disclosures of these applications being hereby incorporated herein by Reference.

FIELD OF THE INVENTION

The invention relates to devices that enable changing the pitch of separation (an operation also referred to as "pitch change" or "re-pitching") between articles that are being conveyed.

The invention has been developed with particular attention paid to its possible application to the manipulation of sanitary articles, such as sanitary pads, pantie liners, etc. The scope of the invention is not, however, limited to this possible field of application.

DESCRIPTION OF THE RELATED ART

The known art regarding re-pitching devices is somewhat extensive, even just as far as the patent literature is concerned.

For example, known from the document U.S. Pat. No. 4,880,102 is a device for transferring articles from a first conveyer, on which the articles themselves are made to advance with a first pitch, onto a second conveyer, on which the articles are made to advance with a second pitch. The device comprises a plurality of conveying elements mounted so that they can rotate about an axis. During rotation about the aforesaid axis, said elements are able to pick up the articles from the first conveyer and transfer them onto the second conveyer. During transfer, the speed of the elements is changed by superimposing upon a constant component of speed a second component, directed in the direction opposite to the general movement of rotation, so as to cause change of pitch between the articles in the passage from the first conveyer to the second conveyer.

Substantially similar solutions are known from other documents, such as for example U.S. Pat. No. 5,480,021 or U.S. Pat. No. 4,506,779.

In the solutions described in the documents cited above, the action of modulation of the tangential or peripheral speed with which the articles move about the axis of rotation of the device is always and in any case accompanied by a certain variation of the radius of the path of the aforesaid movement of rotation about the aforesaid axis.

In other solutions, such as the one described in the document U.S. Pat. No. 4,726,876, the parameter that may be adapted in order to achieve the desired re-pitching action is precisely the variation of the radius of the orbital movement: given the same angular velocity with which two successive articles orbit about a given axis of rotation, the (circumferential) distance of separation between the two articles varies as the radius of the path of the orbital movement changes.

Yet other solutions that can more or less be reduced to the ones described previously are described in the documents U.S. Pat. No. 3,728,191 and U.S. Pat. No. 4,483,351. Known from these latter two cited documents is moreover the possibility of performing, together with pitch change, an orientation of the articles with a joint action referred to as "turn and re-pitch".

The document EP-A-1 179 495, taken as model for the preamble of claim 1, describes a device for changing the pitch between the articles included in a flow of moving articles that comprises at least one plurality of elements for conveying the articles, which are able to perform an orbital movement about a principal axis between a position for pick-up and a position for release of the articles. Associated to each conveying element are movement members for selectively changing the speed of the aforesaid orbital movement in positions corresponding to at least one between the pick-up position and the release position. The device comprises a supporting structure for the conveying elements, which is able to perform a movement of rotation about the aforesaid principal axis. The movement members comprise at least one guide formation, which guides the respective conveying element in a movement according to an arched path centred on the aforesaid principal axis. The movement members control the movement of the conveying elements, maintaining the distance between the conveying elements and the principal axis of the device substantially unaltered.

OBJECT AND SUMMARY OF THE INVENTION

The devices according to the prior art referred to above are basically of a mechanical type, with systems for variation of the speed of the pick-up element or elements (commonly referred to as "shoes") based upon the use of cams or of gear trains capable of summing their relative motions.

Irrespective of the advantages or disadvantages linked to the adoption of the single device, the "mechanical" solutions present a series of intrinsic limitations. For example, for each format of product treated, it is necessary to have available a specific re-pitching unit suitable for treating said product.

The speed jump (i.e., in practice, the acceleration or deceleration that the device is capable of imparting upon the products to bring about change of their distance of separation or pitch) is never higher than a well-defined value. A current evaluation in the sector is that 30% should constitute a maximum value, whereas higher values, up to a maximum of 50%, can be obtained only by reducing considerably the life of the mechanical cam and of the members connected thereto.

In any case, we have to do with rather complex devices, in which many members co-operating with one another in relative motion are present. These members present evident limitations in terms of life on account of wear, which impose frequent interventions in terms of maintenance or replacement of parts and components.

The object of the present invention is to provide a device which will be able to overcome in a radical way the drawbacks inherent in the solutions according to the known art described previously.

According to the present invention, that object is achieved thanks to a device having the characteristics recalled specifically in the ensuing claims. The claims form an integral part of the technical teaching provided herein in relation to the invention.

The solution described herein enables a device to be provided, which, for example, is capable of picking up a product with a certain well-defined pitch and of releasing it with a different pitch after an angle of rotation of approximately 180°.

In the above perspective, the solution described herein exploits the known and consolidated technology that enables, using electronically controlled motor-driven axes, achievement of speed profiles that are variable and controlled in the range of 360° of rotation of the axis itself, taking into due account the fact that the device described herein is designed to carry out a high number of operating cycles in unit time and the fact that the element for picking up the product (the "shoe") is usually connected to a vacuum-generating or suction system (i.e., a system for generating subatmospheric pressure) controlled in the range of 360° of rotation of the device: in particular, the suction pick-up means must be activated an instant before picking-up of the product, remain active and hold the product during the path of approach to the area of release of the product, and de-activate an instant before release.

BRIEF DESCRIPTION OF THE ANNEXED DRAWINGS

The invention will now be described purely by way of nonlimiting example, with reference to the annexed plate of drawings, in which:

FIG. 4 is a cross-sectional view according to the line IV-IV of FIG. 3.

DETAILED DESCRIPTION

In general terms, the device according to the invention, designated by 10, is designed to provide for transfer of articles A from an input conveyer C1 to an output conveyer C2.

Since on the other hand the device 10 illustrated herein can rotate both in a clockwise direction and in a counterclockwise direction, it presents the advantage of being installable indifferently on "right-handed" machines and "left-handed" machines, i.e., on machines operating in opposite directions.

Figure 1:
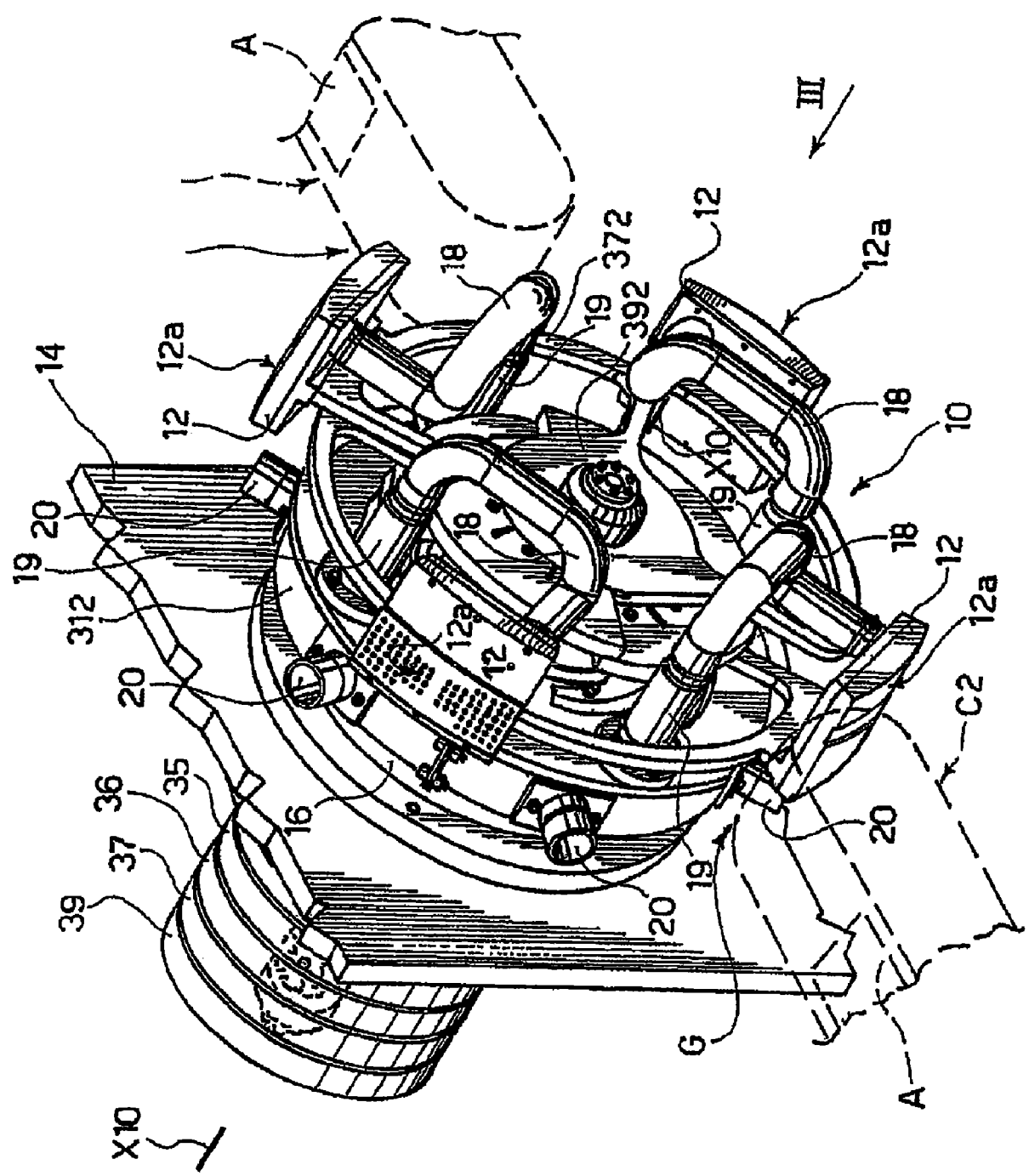
FIG. 1 is a general perspective view of a device such as the one described herein.

Just to clarify our ideas, the articles A (represented schematically just in FIG. 1) can be constituted by sanitary articles such as, for example, sanitary pads, pantie liners, etc.: as has already been said previously, the reference to said possible application must not in any case be interpreted as in any way limiting the scope of the invention.

The conveyers C1 and C2 can be conveyers of any type commonly used in the art. By way of schematic illustration, FIG. 1 refers to two conveyers C1 and C2 of the motor-driven-belt type. Conveyers of this type, provided with corresponding means (for example, suction ones) for withholding the articles A thereon during the conveying movement, are known in the art and hence are such as not to require a detailed description herein. What is important for the purposes of an understanding of the invention is that on the two conveyers C1 and C2 the articles A advance with pitches that are different; for example, the pitch is greater on the conveyer C2 as compared to that on the conveyer C1.

The function of the device 10 is basically to perform transfer of the articles A from the conveyer C1 to the conveyer C2, simultaneously providing re-pitching.

Purely by way orientation, it may be assumed that the two positions or areas T and G, respectively i) of pick-up of the articles A from the conveyer C1 and ii) of deposit or release of the articles A onto the conveyer C2 are diametrically opposite with respect to the device 10, which rotates (for example in a clockwise direction, as viewed in the figures) about a respective principal axis X10.

The nature of the articles A and of the conveyers C1 and C2, as well as the relative location of the areas or positions of pick-up T and of release G could, however, be altogether different, as evidenced, for example, by the different documents according to the known art cited in the introductory part of the present description. Useful reference may be made to said documents for a general illustration of the principle exploited in order to achieve the desired re-pitching action.

According to that principle, the articles A are picked up from the conveyer C1 in the position T with a (peripheral) speed v1 and transferred to the conveyer C2 in the position G with a (peripheral) speed v2, which can be greater or smaller than v1 according to whether it is intended to reduce or else increase the pitch between the articles A.

It will be appreciated that, if ω and r indicate, respectively, the angular velocity of rotation of the device 10 about the axis X10 and the radius of the orbital movement of the articles A, it is not in general mandatory that one of the two speeds v1 and v2 considered previously should correspond to the product ωr. Both the speed v1 and the speed v2 can be obtained as a result of an action of modulation (increase or decrease) of the peripheral speed imparted, respectively, in positions corresponding to the pick-up position T and the release position G on the elements ("shoes") 12 of the device 10 designed to provide the action of pick-up, retention, and release of the articles A.

Broadly speaking, it may then be stated that the device 10, designed to change the pitch between the articles A included in a flow of moving articles, comprises at least one conveying element 12 for the articles A, which is able to perform an orbital movement about the principal axis X10 between a position for pick-up T and a position for release G of the articles A, the speed of the orbital movement being selectively variable in the passage between the pick-up position T and the release position G.

The pick-up elements 12 act on the articles, exerting thereon an action of suction. This effect is obtained by providing the elements 12 with a hollow structure and a radially external wall 12a (usually having a curved profile, roughly speaking a tile-like profile) that is provided with an array of openings. The internal cavities of the elements 12 can be connected selectively to a vacuum line (i.e., a line of subatmospheric pressure), operating in such a way that in each element 12 the condition of negative pressure ("vacuum") will be activated just before picking-up of the article A in the pick-up area T, will remain active to maintain the product attached to the element 12 during the path from the area T to the area of deposit or release G, and will be de-activated just before release of the article A in a position corresponding to the area G.

Consequently, once again reasoning in general terms, the device 10 comprises members for distribution of subatmospheric pressure to at least one conveying element 12 to enable said element 12 to exert selectively a suction action on the articles A.

With the exception of what is described specifically in what follows, the criteria of implementation and the principles of operation mentioned previously are to be deemed unquestionably known to the art and hence such as not to require a detailed description herein.

The device 10 can comprise any number of elements 12: from one to quite a high number. The choice of using four elements 12, as represented in the attached plate of drawings, is currently considered preferential in so far as it provides a good combination between the requirements of efficiency of operation and the desire to make available a device 10 with a structure that is on the whole simple.

The element 12 or each element 12 (in what follows constant reference will be made to the presence of a number of elements 12, and in particular to the presence of four elements 12) is able to perform an orbital movement about the axis X10 with a law of motion (acceleration and deceleration—i.e., "hunting"—with respect to an average angular velocity ω) dictated by a respective actuation pulley. Said actuation pulley is driven, by means of a transmission, for example a belt transmission, by a respective motor drive (not illustrated in the drawings, but of a known type).

In the example of embodiment illustrated herein, in which four elements 12 are present, four actuation pulleys 39, 37, 36 and 35 are present, arranged on the "rear" side of the device 10. The device 10 is, in fact, supported by a vertical plate 14 forming part of a sturdy framework (not illustrated as a whole).

In effect, the device 10 can be seen as extending through the plate 14 along the axis X10 so as to present a front side or portion projecting forwards from the plate 14, where the elements 12 designed to operate on the articles A are mounted. The device 10 has then a rear side or portion, hidden from view by the plate 14, where the pulleys 39, 37, 36 and 35 are mounted, set alongside one another and so that they can rotate about the axis X10.

The pulleys 39, 37, 36 and 35 govern the elements 12 by means of a set of coaxial shafts, all rotatable about the axis X10.

Figure 2:
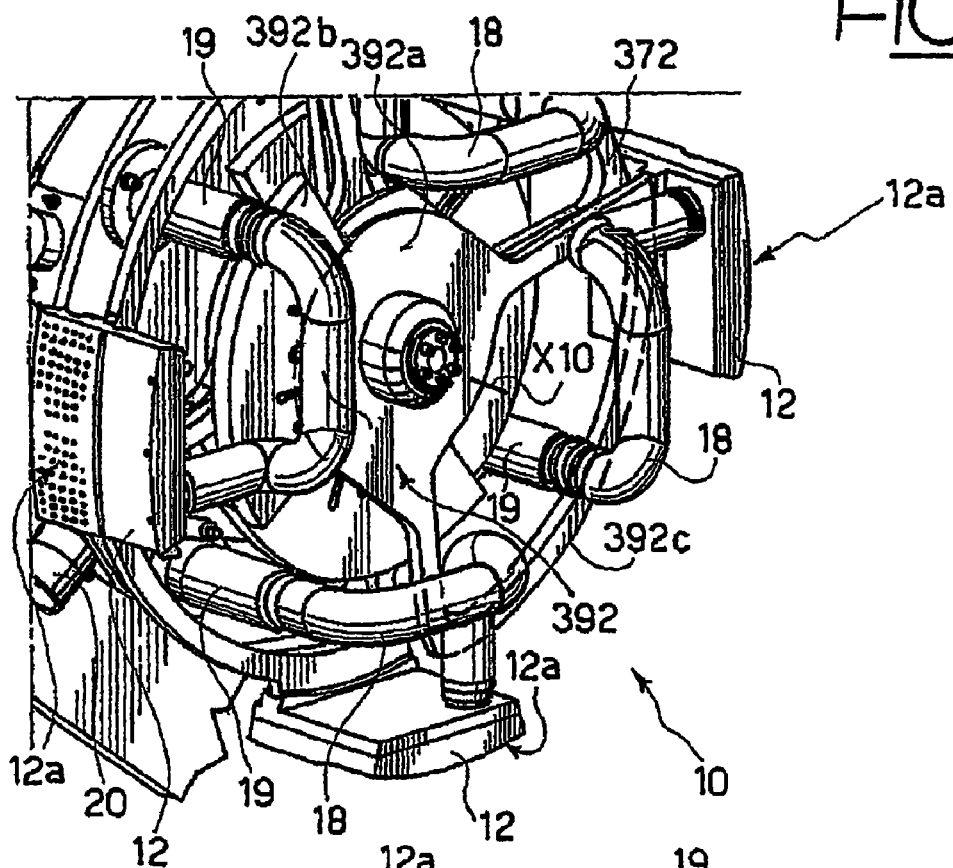
FIG. 2 is another perspective view in greater detail of the same device, represented in a position of rotation slightly different from that of FIG. 1.

With reference to the cross-sectional view of FIG. 4, the pulley 39 is mounted on a (rear) end of a central shaft 391. The shaft 391 carries, at its front end an arm 392 (see also FIGS. 1 to 3), which extends radially from the axis X10 and carries, at its distal end, one of the elements 12.

The pulley 37 is mounted on a (rear) end of a hollow shaft 371, which is fitted on the central shaft 391 and can rotate freely thereon. The hollow shaft 371 carries, at its front end, an arm 372 (see also FIGS. 1 to 3), which extends radially from the axis X10 in a position set—on the inside of the device 10—alongside the arm 392, and carries a second element 12.

The pulley 36 is mounted on a (rear) end of a hollow shaft 361, which is fitted about the shaft 371 and can rotate freely thereon. The hollow shaft 361 carries, at its front end, an arm 362 (not visible in FIGS. 1 to 3, in so far as it is hidden by the arms 392 and 372), which extends radially from the axis X10 in a position set—on the inside of the device 10—alongside the arm 372 and carries a third element 12.

Finally, the pulley 35 is mounted on a (rear) end of a hollow shaft 351, which is fitted about the shaft 361 and can rotate freely thereon. The hollow shaft 351 carries, at its front end, an arm 352 (not visible in FIGS. 1 to 3, in so far as it also is hidden by the arms 392 and 372), which extends radially from the axis X10 in a position set—on the inside of the device 10—alongside the arm 372 and carries a third element 12.

Of course, the mechanical congruence of the ensemble illustrated and the capacity of rotation with respect to the axis X10 in the terms described previously is ensured by the presence of bearings, lubrication ports and seal members, which are clearly visible in the cross-sectional view of FIG. 4. Said components are not described herein in detail in so far as their presence, location and sizing fall within the scope of normal design tasks required of a person skilled in the sector.

From what has been said previously it may be inferred that the pulleys 39, 37, 36, are capable of imparting upon the corresponding arms 392, 372, 362 and 352 (and hence upon the pick-up elements 12 carried thereby) laws of orbital movement about the axis X10—and hence laws of acceleration/deceleration with respect to the reference angular velocity ω—that are altogether free and virtually independent of one another, except for the need to prevent the arms 392, 372, 362 and 352 from interfering with one another, in the terms described in greater detail in what follows. The device 10 described herein comprises, in fact, a number of arms 392, 372, 362 and 352 equal to the number of the elements 12. Each arm hence has a corresponding actuation shaft 391, 371, 361 and 351 and a corresponding independent motor drive via the pulleys 39, 37, 36 and 35.

The structure with coaxial shafts 391, 371, 361, 351 is completed by a further element: a pulley 31 is in fact mounted on a (rear) end of a further hollow shaft 311, which is fitted about the shaft 361 and can rotate freely with respect thereto. The hollow shaft 311 is mounted so that it can turn (again on bearings) within a tubular sleeve 16 fixed to the plate 14, thus ensuring support of the device 10 as a whole by the framework comprising the plate 14.

The shaft 311 carries, at its front end, an annular distributor 312 with an external radial dimension approximately corresponding to the radial dimension of the orbital path followed by the elements 12 about the axis X10. The distributor 312, which is in a position set alongside—on the inside of the device 10—with respect to the orbital path of the elements 12, is hence also able to rotate about the axis X10 with a speed determined by the speed of rotation of the respective pulley 31.

Typically, the distributor 312 is made to rotate (by the motor—not illustrated—that drives the pulley 31) at a constant speed, i.e., at the reference angular velocity ω and "in phase" with the line comprising the conveyers C1 and C2. In particular, if—as illustrated in the annexed plate of drawings—four elements 12 are present and the rate of the line is N articles per minute, the speed of rotation of the distributor will be N/4 r.p.m.

The reference number 18 designates flexible pipes or hoses (for example, made of rubber or a similar elastomer, or else so-called "spiralled" hoses, or else swivel hoses), each of which connects one of the elements 12 to the distributor 312 via a corresponding union 19.

The hoses 18 form part of the "pneumatic" section of the device 10, i.e., of the system that enables application to the elements 12, in a way that is coordinated with their angular position, of a level of subatmospheric pressure or "vacuum", operating in such a way that in each element 12 the condition of negative pressure ("vacuum") will be activated just before picking-up of the article A in the pick-up area T, will remain active to keep the product attached to the element 12 during passage from the pick-up area T to the area of deposit or release G, and will be de-activated just before release of the article A in a position corresponding to the area G.

For the above purpose, the unions 19, which extend usually in an axial direction, forwards, with respect to the distributor 312, come, within the distributor 312 itself, under respective ducts 20. The ducts 20 extend radially, like studs, from the distributor 312 and are designed to co-operate with an annular manifold (not illustrated) that surrounds the distributor 312 and can be connected to a line of subatmospheric pressure (vacuum line).

As a result of the rotation of the distributor 312 in the aforesaid manifold (and according to criteria in themselves known: see, for example, the document EP-A-1 179 495 already cited previously), each duct 20 will be exposed to a level of atmospheric or subatmospheric pressure according to the portion of the manifold at which the duct is located at that particular moment as a result of the rotation of the distributor 312. That level of atmospheric or subatmospheric pressure will then be transmitted to the elements 12 through the flexible pipes or hoses 18.

The fact that these pipes are flexible means that each element 12 is free to move with respect to the corresponding supply union 19 with a wide range of angular displacement.

In practice, the range of possible angular displacement is comprised between:
- a first end position, in which the union 19 (with the pipe or hose 18 that usually extends "forwards" with respect to the element 12 in the direction of rotation of the device 10) in effect insinuates itself underneath the element 12 in a position strictly adjacent to the point in which the corresponding pipe or hose 18 is connected to the element 12; and
- a second end position, in which the union 19 is located approximately up against the element 12, which is adjacent (usually "in front of" with respect to the direction of rotation of the device 10) to the element 12, to which the union 19 is connected.

Figure 3:
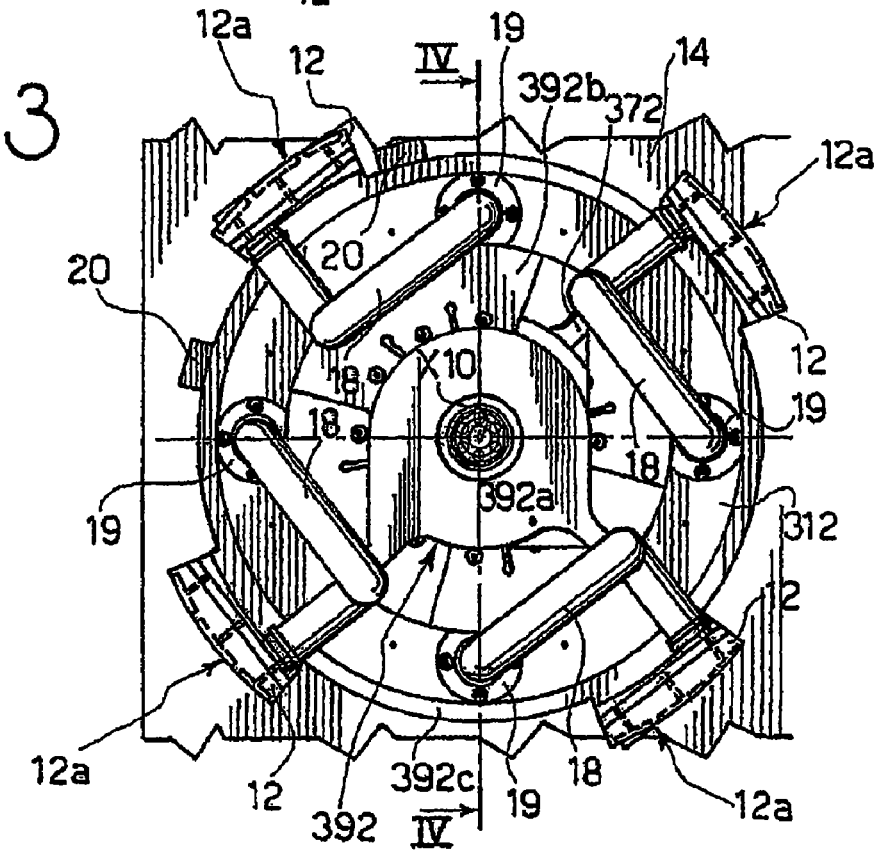
FIG. 3 is a front view of the same device, as viewed in the direction substantially identified by the arrow III of FIG. 1.

Observing, in particular, the front view of FIG. 3 (where the four unions 19 are shown in positions at the same angular distance apart from one another of 90° on the development of the distributor 312), it may be understood that this results in the capacity for each element 12 to perform, with respect to the device 10 as a whole, an angular travel with an amplitude of virtually 90° (in effect slightly less, for physical reasons of encumbrance of the elements involved), with a corresponding considerable capacity of "hunting" of the angular velocity with respect to the mean angular velocity of the device 10 itself, which results in a wide range of possible accelerations/decelerations that can be used for the purposes of the action of "re-pitching".

Reasoning once again in general terms, in the device 10 described herein:
- the members for distribution of subatmospheric pressure comprise the distributor 312, which can turn about the principal axis X10 of the device; and
- set between the rotating distributor 312 and the conveying element 12 or each conveying element 12 is a respective flexible pipe or hose 18 for transferring the subatmospheric pressure to the conveying element 12.

The flexibility of said pipe 18 enables relative angular orientation between the distributor 312 and the conveying element 12 with respect to the principal axis X10 of the device 10.

From the plate of drawings (and in particular from FIGS. 1, 2 and 3, as regards the arm 391), it may be noted that even though they may nominally be made in the form of pure and simple linear arms, the arms 392, 372, 362 and 352 are in actual fact provided in the form of a rocker structure.

Limiting our attention, for reasons of simplicity of illustration, just to the arm 392 that is most clearly visible in the figures, in said structure it is in general possible to distinguish (see the detail of FIG. 3):
- a central disk 392a;
- a counterweight 392b, located on the side opposite to the element 12 so as to reduce the moment of inertia generated by an eccentric load such as the element 12; and
- a "brace-like" formation 392c comprising two rectilinear stretches which extend radially from the disk 392a and the distal ends of which are connected by a stretch having the shape of the arc of a circle.

The arm carries the respective element 12 in a position corresponding to one of the aforesaid rectilinear stretches, so that the brace formation 392c describes within it an opening or hole that is more or less angularly extensive (according to the values of acceleration/deceleration to be imparted thereon), through which there extends the corresponding pipe or hose 18 and the union 19 to which the hose is connected. This is obtained in such a way as not to interfere with the movement of orientation of the arm with respect to the device 10 as a whole, at the same time preventing any accidental impact between the various elements 12.

Even though this solution is not illustrated herein for reasons of simplicity, it is evident that the elements 12 can be mounted on the corresponding arms with a capacity for orientation so as to be able to exert on the articles A, in addition to the action of re-pitching, also an action of rotation in the passage from the conveyer C1 to the conveyer C2. This solution, known as "turn and re-pitch" can entail, for example, a rotation of 90°, so as to bring articles that advance "lengthways" to advance "sideways", or vice versa. Details of implementation of elements 12 usable for an action of combined re-pitching and rotation (turn and re-pitch) may be inferred from some of the documents cited in the introductory part of the present description.

A device such as the device 10 described herein may be used to advantage in providing kits for the production of re-closeable adhesive tabs for hygienic or sanitary products, such as the so-called "training pants", or else for the application of so-called "side panels", i.e., shaped adhesive tabs for traditional diapers. By way of further example, a device such as the device 10 described herein is usable for adjusting, during application, the position of the absorbent insert of the training-pant product, both for babies and for adults, or else for appropriately adjusting the position of absorbent products for ladies when these products are placed on the plastic of the packaging envelope.

The examples referred to above are of course just examples of an extremely wide and differentiated range of possible applications.

A device such as the device 10 described herein for example makes it possible to achieve a pitch change from 208 mm to 740 mm, with a diameter of the circular path described by the outer walls of the elements 12 in the region of 500 mm.

The pitch change in question is equal to 355%, a value up to now considered impossible to reach with a re-pitching operation (or even with two operations of pitch change performed one after another) obtained using traditional mechanical devices.

The solution described herein exploits, in particular with reference to the shafts 391, 371, 361, 351 and 311 (and to the members 12 and 312 carried thereby) the possibility of performing with electronically controlled motor-driven axes (via the pulleys 39, 37, 36, 35 and 31) variable and controlled speed profiles through a full circle of rotation of the axis itself.

These speed profiles are readily adaptable, electronically, to articles A of different format; in this way, the need to have a specific re-pitching unit pre-arranged for each format of article A is avoided.

The structure of the device is on the whole simple, with a reduced presence of members co-operating with one another in relative motion. The device described herein is able to carry out a large number of operating cycles in unit time, without being subject to early wear.

Of course, without prejudice to the principle of the invention, the details of construction and the embodiments may vary widely with respect to what is described and illustrated herein, without thereby departing from the scope of the present invention as defined by the annexed claims.

The invention claimed is:

1. A device for changing the pitch between articles in a flow of moving articles, comprising:

at least one conveying element for conveying the articles, adapted to perform an orbital motion about a principal axis between a position for pick-up and a position for release of the articles, a speed of said orbital movement being selectively variable in a passage between said position of pick-up and said position of release; and members for distribution of subatmospheric pressure to said at least one conveying element to enable said at least one conveying element to perform selectively an action of suction to pick up said articles, said members for distribution of subatmospheric pressure comprising a distributor which can turn about said principal axis;

set between said one rotating distributor and said at least one conveying element is a respective flexible pipe or hose for transferring said subatmospheric pressure to said at least one conveying element; the flexibility of said pipe or hose enabling the relative angular orientation between said distributor and said at least one conveying element with respect to said principal axis; and wherein said distributor and said at least one conveying element are carried by respective coaxial shafts, rotatable about said principal axis.

2. The device according to claim 1, wherein said at least one conveying element has a hollow structure and a radially external wall having an array of openings, said hollow structure being connected to said respective flexible pipe or hose.

3. The device according to claim 1 wherein said at least one conveying element comprises a plurality of conveying elements coupled to respective pipes or hoses.

4. The device according to claim 3, wherein said at least one element comprises four conveying elements.

5. The device according to claim 1, wherein said at least one element comprises a plurality of said conveying elements carried by a plurality of respective coaxial shafts, rotatable about said principal axis.

6. The device according to claim 1, wherein said respective coaxial shafts comprise a central axis and at least one hollow shaft fitted about said central axis.

7. The device according to claim 1, wherein said respective coaxial shafts are coupled to respective rotation-control members.

8. The device according to claim 7, wherein said respective rotation-control members comprise pulleys.

9. The device according to claim 8, wherein said pulleys are set alongside one another.

10. The device according to claim 1, wherein said respective coaxial shafts are coupled to said respective rotation-control members in positions corresponding to portions of said respective coaxial shafts opposite to said distributor and to said at least one element.

11. The device according to claim 1, further comprising a supporting framework, said respective coaxial shafts are mounted in said framework so that they can rotate in a tubular sleeve fixed to said supporting framework.

12. The device according to claim 1, wherein said distributor is of an annular shape and is arranged in a position set alongside the path of the orbital movement of said at least one conveying element.

13. The device according to claim 1, wherein said distributor is of an annular shape and has radial dimensions approximately corresponding to the radial dimensions of the path of the orbital movement of said at least one conveying element.

14. The device according to claim 1, wherein associated to said flexible pipe or hose is a respective union for connection to said distributor.

15. The device according to claim 1, wherein said at least one union extends in an axial direction with respect to the distributor.

16. The device according to claim 14, further comprising a plurality of said unions, uniformly distributed over the angular development of the distributor.

17. The device according to claim 1, wherein said distributor has ducts extending radially from the distributor and adapted to co-operate with an annular manifold for supply of said subatmospheric pressure, said manifold surrounding the distributor.

18. The device according claim 1, wherein said at least one conveying element is carried by a respective rocker arm with a counterweight associated thereto situated on the branch of the rocker opposite to said at least one conveying element.

19. The device according to claim 1, wherein said at least one conveying element is carried by a respective arm via a brace-like formation; said brace-like formation describing an opening for the passage of said respective flexible pipe or hose.

20. The device according to claim 1, wherein said respective flexible pipe or hose extends forwards starting from said at least one conveying element in the direction of said orbital movement.

21. A device for changing the pitch between articles in a flow of moving articles, comprising:

at least one conveying element for conveying the articles, adapted to perform an orbital motion about a principal axis between a position for pick-up and a position for release of the articles, a speed of said orbital movement being selectively variable in a passage between said position of pick-up and said position of release; and members for distribution of subatmospheric pressure to said at least one conveying element to enable said at least one conveying element to perform selectively an action of suction to pick up said articles, said members for distribution of subatmospheric pressure comprising a distributor which can turn about said principal axis;

set between said one rotating distributor and said at least one conveying element is a respective flexible pipe or hose for transferring said subatmospheric pressure to said at least one conveying element; the flexibility of said pipe or hose enabling the relative angular orientation between said distributor and said at least one conveying element with respect to said principal axis; and wherein said distributor has ducts extending radially from the distributor and adapted to co-operate with an annular manifold for supply of said subatmospheric pressure, said manifold surrounding the distributor.

* * * * *